(12) United States Patent
Koss et al.

(10) Patent No.: US 8,764,892 B2
(45) Date of Patent: Jul. 1, 2014

(54) REABSORBER FOR AMMONIA STRIPPER OFFGAS

(71) Applicant: ALSTOM Technology Ltd, Baden (CH)

(72) Inventors: Peter Ulrich Koss, Baden (CH); Frederic Zenon Kozak, Knoxville, TN (US)

(73) Assignee: ALSTOM Technology Ltd, Baden (CH)

( * ) Notice: Subject to any disclaimer, the term of this patent is extended or adjusted under 35 U.S.C. 154(b) by 14 days.

(21) Appl. No.: 13/775,658

(22) Filed: Feb. 25, 2013

(65) Prior Publication Data

US 2013/0189163 A1    Jul. 25, 2013

Related U.S. Application Data

(62) Division of application No. 12/510,336, filed on Jul. 28, 2009, now Pat. No. 8,404,027.

(60) Provisional application No. 61/111,049, filed on Nov. 4, 2008.

(51) Int. Cl.
   *B01D 53/14*    (2006.01)
(52) U.S. Cl.
   USPC ............... 96/243; 95/179; 95/183; 95/199; 95/223; 95/232; 95/236
(58) Field of Classification Search
   None
   See application file for complete search history.

(56) References Cited

U.S. PATENT DOCUMENTS

| 1,897,725 A | 2/1933 | Gaus et al. |
| 2,043,109 A | 6/1936 | McKee et al. |
| 2,106,734 A | 2/1938 | Gollmar |

(Continued)

FOREIGN PATENT DOCUMENTS

| DE | 469840 | 12/1928 |
| DE | 2832493 | 7/1978 |

(Continued)

OTHER PUBLICATIONS

A.C. Yeh, H. Bai: "Comparison of ammonia and monoethanolamine solvents to reduce CO2 greenhouse gas emissions" The Science of the Total Environment, vol. 338, 1999, pp. 121-133, XP002529608.

(Continued)

*Primary Examiner* — Duane Smith
*Assistant Examiner* — Pankti Patel
(74) *Attorney, Agent, or Firm* — Robert D. Crawford (57) ABSTRACT

A method for removal of CO2 from a flue gas stream, comprising the steps of: a) contacting a flue gas stream comprising CO2 with a first absorption liquid comprising NH3 such that the flue gas stream is depleted in CO2; b) contacting the flue gas stream depleted in CO2 of step a) with a second absorption liquid such that NH3 from the flue gas stream is absorbed in said second absorption liquid to form a flue gas stream depleted in CO2 and NH3; c) separating NH3 from the second absorption liquid such that a gas stream comprising NH3 is obtained; d) contacting said gas stream comprising NH3 separated in step c) with a third absorption liquid such that NH3 is absorbed in said third absorption liquid. A system for removal of CO2 from a flue gas stream, the system comprising: a CO2 absorption stage; an NH3 absorption stage; and a reabsorption stage.

14 Claims, 2 Drawing Sheets

(56) References Cited

U.S. PATENT DOCUMENTS

| | | | |
|---|---|---|---|
| 2,487,576 A | 11/1949 | Meyers | |
| 2,608,461 A | 8/1952 | Frazier | |
| 2,878,099 A | 3/1959 | Breuing et al. | |
| 3,255,233 A | 6/1966 | Kunze et al. | |
| 3,923,955 A | 12/1975 | Fattinger | |
| 4,515,760 A | 5/1985 | Lang et al. | |
| 4,847,057 A | 7/1989 | Brugerolle et al. | |
| 4,977,745 A | 12/1990 | Heichberger | |
| 4,999,031 A * | 3/1991 | Gerhardt et al. | 95/162 |
| 5,067,972 A | 11/1991 | Hemmings et al. | |
| 5,137,550 A | 8/1992 | Hegarty et al. | |
| 5,186,916 A | 2/1993 | Nevels | |
| 5,318,758 A | 6/1994 | Fujii et al. | |
| 5,354,545 A | 10/1994 | Buisman | |
| 5,378,442 A | 1/1995 | Fujii et al. | |
| 5,427,759 A | 6/1995 | Heitmann | |
| 5,453,115 A | 9/1995 | Vuletić | |
| 5,458,663 A | 10/1995 | Teague et al. | |
| 5,462,583 A | 10/1995 | Wood et al. | |
| 5,533,338 A | 7/1996 | Lee et al. | |
| 5,599,508 A | 2/1997 | Martinelli et al. | |
| 5,648,053 A | 7/1997 | Mimura et al. | |
| 5,700,311 A | 12/1997 | Spencer | |
| 5,736,115 A | 4/1998 | Iijima et al. | |
| 5,756,058 A | 5/1998 | Watanabe et al. | |
| 5,832,712 A | 11/1998 | Rønning et al. | |
| 5,853,680 A | 12/1998 | Iijima et al. | |
| 5,979,180 A | 11/1999 | Lebas et al. | |
| 6,027,552 A | 2/2000 | Ruck et al. | |
| 6,210,467 B1 | 4/2001 | Howard | |
| 6,228,145 B1 | 5/2001 | Falk-Pedersen et al. | |
| 6,258,151 B1 | 7/2001 | Härle et al. | |
| 6,344,177 B1 | 2/2002 | Littleford | |
| 6,348,088 B2 | 2/2002 | Chung | |
| 6,372,023 B1 | 4/2002 | Kiyono et al. | |
| 6,458,188 B1 | 10/2002 | Mace | |
| 6,485,547 B1 | 11/2002 | Iijima | |
| 6,497,852 B2 | 12/2002 | Chakravarti et al. | |
| 6,506,350 B2 | 1/2003 | Cooper et al. | |
| 6,667,347 B2 | 12/2003 | O'Rear et al. | |
| 6,689,332 B1 | 2/2004 | Yoshida et al. | |
| 6,720,359 B2 | 4/2004 | O'Rear et al. | |
| 6,759,022 B2 | 7/2004 | Hammer et al. | |
| 6,764,530 B2 | 7/2004 | Iijima | |
| 7,022,296 B1 | 4/2006 | Khang et al. | |
| 7,083,662 B2 | 8/2006 | Xu et al. | |
| 7,128,777 B2 | 10/2006 | Spencer | |
| 7,160,456 B2 | 1/2007 | Järventie | |
| 7,192,468 B2 | 3/2007 | Mak et al. | |
| 7,204,867 B2 | 4/2007 | Nielsen et al. | |
| 7,244,405 B2 | 7/2007 | Thielert | |
| 7,255,842 B1 | 8/2007 | Yeh et al. | |
| 7,377,967 B2 | 5/2008 | Reddy et al. | |
| 7,424,808 B2 | 9/2008 | Mak | |
| 7,485,275 B2 | 2/2009 | Asprion et al. | |
| 7,597,746 B2 | 10/2009 | Mak et al. | |
| 7,637,987 B2 | 12/2009 | Mak | |
| 7,641,717 B2 | 1/2010 | Gal | |
| 7,758,673 B2 | 7/2010 | Brok et al. | |
| 7,846,240 B2 | 12/2010 | Gal et al. | |
| 7,892,509 B2 | 2/2011 | Iijima et al. | |
| 7,927,403 B2 | 4/2011 | Versteeg et al. | |
| 2003/0045756 A1 | 3/2003 | Mimura et al. | |
| 2003/0140786 A1 | 7/2003 | Iijima | |
| 2004/0123736 A1 | 7/2004 | Torres, Jr. et al. | |
| 2004/0126294 A1 | 7/2004 | Cooper et al. | |
| 2005/0169825 A1 | 8/2005 | Cadours et al. | |
| 2006/0150813 A1 | 7/2006 | Tognazzo | |
| 2006/0178259 A1 | 8/2006 | Schubert et al. | |
| 2006/0204425 A1 | 9/2006 | Kamijo et al. | |
| 2007/0006565 A1 | 1/2007 | Fleischer et al. | |
| 2008/0072762 A1 | 3/2008 | Gal | |
| 2008/0178733 A1 | 7/2008 | Gal | |
| 2008/0307968 A1 | 12/2008 | Kang et al. | |
| 2009/0101012 A1 | 4/2009 | Gal et al. | |
| 2009/0155889 A1 | 6/2009 | Handagama et al. | |
| 2009/0282977 A1* | 11/2009 | Koss | 95/199 |
| 2010/0021362 A1 | 1/2010 | Hunwick | |
| 2010/0092359 A1 | 4/2010 | Svendsen et al. | |
| 2010/0107875 A1 | 5/2010 | Koss et al. | |
| 2010/0229723 A1 | 9/2010 | Gelowitz et al. | |
| 2011/0052453 A1 | 3/2011 | McLarnon et al. | |

FOREIGN PATENT DOCUMENTS

| | | |
|---|---|---|
| DE | 3633690 | 4/1988 |
| EP | 0243778 | 11/1987 |
| EP | 0588178 | 3/1994 |
| GB | 271852 | 5/1926 |
| GB | 871207 | 6/1961 |
| GB | 899611 | 6/1962 |
| GB | 2331526 | 5/1999 |
| JP | 10 202054 | 8/1998 |
| JP | 11 137960 | 5/1999 |
| KR | 100703999 B1 | 3/2007 |
| SU | 512785 | 5/1976 |
| SU | 1567251 | 5/1990 |
| WO | 02/09849 | 2/2002 |
| WO | 2005/087351 | 9/2005 |
| WO | 2008/101293 | 8/2008 |

OTHER PUBLICATIONS

Removal of Carbon Dioxide from Flue Gas by Ammonia Carbonation in the Gas Phase, Xiaonian Li, Edward Hagaman, Costas Tsouris, and James W. Lee, Energy & Fuels 2003, 17, 69-74.

Schussler et al., "Carbon Dioxide Removal from Fossil Fuel Power Plants by Refrigeration Under Pressure", IEEE, 1989.

Resnik et al., "Aqua Ammonia Process for Simultaneous Removal of CO2, SO2 and NOx," Int. J. Environmental Tech. and Management, May 31, 2004 (approx.), pp. 89-104, vol. 4, Nos. 1/2.

Andrea Corti et al., "Reduction of Carbon Dioxide emissions from a SCGT/CC by Ammonia Solution Absorption Preliminary Results" International Journal of Thermodynamics, International Centre for Applied Thermodynamics, Istanbul, TR, vol. 7, No. 4, Dec. 1, 2004, pp. 173-181.

"Semi-batch absorption and regeneration studies for CO2 capture by aqueous ammonia", Fuel Processing Technology, vol. 86, No. 14-15, Oct. 1, 2005, pp. 1533-1546.

PCT Tnternational Search Report and The Written Opinion of the International Searching Authority dated Jan. 27, 2010—(PCT/US2009/061220).

* cited by examiner

REABSORBER FOR AMMONIA STRIPPER OFFGAS

CROSS-REFERENCE TO RELATED APPLICATIONS

This is a divisional application of pending U.S. application Ser. No. 12/510,336 filed Jul. 28, 2009, which is a non-provisional of U.S. Ser. No. 61/111,049, filed Nov. 4, 2008, each incorporated herein in its entirety by reference.

FIELD OF THE INVENTION

The present invention relates to methods and systems for removal of CO2 from gas streams by contacting the gas stream with an absorption liquid comprising NH3 such that the gas stream is depleted in CO2.

BACKGROUND

The proposed invention is directed to a method and a system for industrial separation of carbon dioxide (CO2) from flue gas, natural gas, syngas or other gas streams mainly containing nitrogen, oxygen, hydrogen, carbon monoxide or methane, where liquid ammonia (NH3) solutions are used as a solvent. The CO2 is absorbed in the solvent in an absorption process. This process may be generally referred to as the CO2 absorption process.

After absorption of the CO2 from a gas with ammonia based solutions, residual ammonia is often still present in the treated gas. This residual ammonia has to be removed in a separate process step, before the treated gas can be further processed or sent to the atmosphere.

Ammonia is removed from the gas in a wash step by scrubbing the flue gas with a wash liquid in an adequate contacting device. This process may be generally referred to as the NH3 absorption process. In general, fresh water or water or weak ammonia solution coming from a stripping process is used as the wash liquid.

After the wash step, the wash liquid will contain the ammonia absorbed from the gas. The wash liquid is then sent to an ammonia stripping process, where the ammonia is separated from the wash liquid. The stripped wash liquid is generally recycled to the wash step. The ammonia separated from the wash liquid leaves the stripping process as a stripper offgas stream containing mainly ammonia, CO2 and water vapor, but also a usually small fraction of non condensable co-absorbed gas components from the flue gas.

The stripper offgas stream is generally either discharged to the atmosphere or introduced into a regenerator unit in which CO2 is separated and removed from the ammonia based solution, and the ammonia based solution depleted of CO2 is recycled to the CO2 absorption.

SUMMARY OF THE INVENTION

It is an object of the various aspects of the present disclosure to provide improved removal of CO2 from a gas stream by absorption of CO2 in an ammonia solution.

It is another object of the various aspects of the present disclosure to provide improved recycling of NH3 in a process for removal of CO2 from a gas stream by absorption of CO2 in an ammonia solution.

Other objects of the present invention may be to obtain environmental, health and/or economical benefits of reduced emission of chemicals used in a gas purification process.

The term "flue gas", as used herein, generally refers to any type of gas stream comprising CO2. Examples of such gas streams include, but are not limited to, flue gas streams resulting from the combustion of organic materials, natural gas, syngas or other gas streams mainly containing nitrogen, oxygen, hydrogen, carbon monoxide or methane.

In a first aspect of the invention, the above mentioned objects, as well as further objects, which will become apparent to the skilled person when presented with the present disclosure, are achieved by a method for removal of CO2 from a flue gas stream, comprising the steps of:

a) contacting a flue gas stream comprising CO2 with a first absorption liquid comprising NH3 such that the flue gas stream is depleted in CO2;

b) contacting the flue gas stream depleted in CO2 of step a) with a second absorption liquid such that NH3 from the flue gas stream is absorbed in said second absorption liquid to form a flue gas stream depleted in CO2 and NH3;

c) separating NH3 from the second absorption liquid such that a gas stream comprising NH3 is obtained;

d) contacting said gas stream comprising NH3 separated in step c) with a third absorption liquid such that NH3 is absorbed in said third absorption liquid.

The step d) of the present method, wherein NH3 obtained in step c) is reabsorbed, enables and/or facilitates recycling of NH3 for reuse in the CO2 absorption of step a).

By enabling and/or facilitating recycling of NH3, the present method also allows for increasing the efficiency of the CO2 removal.

Generally, when absorbing components from a gas stream into an absorption liquid, a gas liquid mass transfer device (MTD) is used for bringing the gas into contact with the absorption liquid. Non-limiting examples of MTDs include packed bed columns and plate columns.

In an embodiment of the method, step a) is performed in a first gas liquid mass transfer device (first MTD), step b) is performed in a second gas liquid mass transfer device (second MTD) and step d) is performed in a third gas liquid mass transfer device (third MTD), wherein said first and third gas liquid mass transfer devices are separated from each other.

The separation NH3 from the second absorption liquid in step c) is generally performed by providing a suitable temperature and pressure such that components in the absorption liquid having a lower boiling point, e.g. NH3 and CO2 are transferred to the vapor phase, while components having a higher boiling point remain in the liquid phase. The separation may for example be performed in a stripper comprising heating means, such as a heat exchanger configured to receive steam and transfer heat to the absorption liquid. The stripper may optionally comprise a vacuum generator configured to reduce the pressure inside the stripper.

The gas stream produced in step c), which generally comprises NH3, CO2 and other low boiling point contaminants, is also referred to herein as the "stripper offgas stream".

In some prior art chilled ammonia based CO2 removal systems, the gas stream comprising NH3 obtained in step c), also referred to herein as the stripper offgas stream is introduced directly into the first MTD, where ammonia and CO2 may be absorbed in the first absorption liquid. A disadvantage of introducing the stripper offgas stream directly into the first MTD is that the condensation and absorption heat set free by ammonia and CO2 of the stripper offgas stream puts an additional load on the refrigeration system of the main CO2 absorption, leading to increased energy consumption. Furthermore, the absorption process may be disturbed by the formation of hotspots in the first MTD caused by the introduction of the stripper offgas stream.

In other prior art chilled ammonia based CO2 removal systems, the stripper offgas stream is introduced into the regenerator which is used for separating absorbed CO2 from the first absorption solution and recovering the absorption solution for reuse in the first MTD. A disadvantage of introducing the stripper offgas stream into the regenerator is that the regenerator is generally operated at high pressures, such as 20 bar or higher, and the stripper must be operated at a pressure higher than the pressure of the regenerator. This requires a high pressure design of the stripper which is costly and difficult to operate and results in high operating temperatures. Furthermore, the energy requirement of the stripper needs to be covered by a higher temperature heat source, generally medium pressure (MP) steam (e.g. steam having a pressure of about 30-60 bar). Due to the corrosivity of the stripper offgas and the danger of solid formation, it is not desirable to introduce a compression step to raise the pressure of the gas, which creates a dependency between the design pressure of the said stripping process and the options for further processing the gas stream. Another disadvantage is that non-condensable contaminants present in the stripper offgas stream end up in the CO2 product obtained from the regenerator.

Embodiments of the present method and system for CO2 removal allow the use of a low pressure stripper heated with low pressure (LP) steam (e.g. 1-10 bar), but avoids to burden the CO2 absorber and the refrigeration system with the condensation and absorption heat of the ammonia and the additional CO2 fed to the CO2 absorption. The low pressure stripper is cheaper, easier to operate and more safe. The LP steam is a cheaper utility than the MP steam used in a high pressure stripper.

In embodiments of the present method, the absorption in step d) may take place at pressures only slightly above the pressure of the CO2 absorption in step a), which is usually in a range of about 1.5 to 2.0 bar. The stripper offgas stream, which needs to be fed to the third MTD at a slightly higher pressure, can be produced in a stripper operating at a pressure which is only slightly higher than the pressure of the CO2 absorption in step a).

As an example, in order to enhance the absorption in step d), it is desirable to operate the absorption in step d) at a pressure that is 1-4 bar higher than the pressure of the CO2 absorption in step a), but that is sufficiently low to allow the use of LP steam as the heating medium for the stripper. The absorption parameters and dimensions of the third MTD may preferably be selected such that only small amounts of NH3 remain in the residual offgas stream obtained after absorption. Such parameters and dimensions may be readily determined by a person skilled in the art.

NH3 and CO2 absorbed in the third absorption liquid in step d) may advantageously be returned to the CO2 absorption in step a) whereby NH3 may be reused for CO2 absorption and CO2 may be transferred to the CO2 product stream.

Thus, in an embodiment, the method further comprises the step:

e) joining the third absorption liquid of step d) containing absorbed NH3 with the first absorption liquid.

The third absorption liquid may be joined with CO2 rich or CO2 lean first absorption liquid in step e). However it is preferable to join the third absorption liquid with CO2 rich first absorption liquid.

The small residual gas stream leaving the third MTD can be introduced either directly into the flue gas stream or into an appropriate location of the CO2 removal system where it will not put too much additional burden on the CO2 absorption since the amount of CO2 and ammonia is very small. The co-absorbed non-condensable contaminants from the stripper offgas stream end up in the treated flue gas and not in the CO2 product stream.

In an embodiment, the method further comprises the step:

f) joining residual gas depleted in NH3 from step d) with the flue gas stream before it is contacted with the second absorption liquid in step b).

In an embodiment, the residual gas from step d) is joined with the flue gas stream before the flue gas is contacted with the first absorption liquid.

In an embodiment, the residual gas from step d) is joined with the flue gas stream which is being contacted with the first absorption liquid.

In an embodiment, the residual gas from step d) is joined with the flue gas stream after it has been contacted with the first absorption liquid in step a).

The third absorption liquid may be separate from the first absorption liquid. However, in embodiments of the present method and system for CO2 removal, CO2 rich or lean first absorption liquid solution can be used as the third absorption liquid in step d). Thus, at least a portion of the third absorption liquid may be made up of first absorption liquid. As examples, about 25%, 50%, 75% or 100% by weight of the third absorption liquid may be made up of first absorption liquid. Any remaining portion of the third absorption liquid can be made up of water or an aqueous solution or other liquid suitable for absorbing NH3 from a gas stream.

Thus, in an embodiment, the third absorption liquid comprises a portion of the first absorption liquid.

It has been found by the present inventors that the first absorption liquid may advantageously be used also as the third absorption liquid. This may for example be done by deriving a portion of the first absorption liquid used in the CO2 absorption, contacting the derived first absorption liquid with the stripper offgas stream in the third MTD, and returning the absorption liquid for reuse in the CO2 absorption, optionally after regeneration.

Thus, in an embodiment, the third absorption liquid consists of a portion of the first absorption liquid.

In an embodiment, the third absorption liquid consists of a portion of the first absorption liquid and step d) is performed by bubbling the gas stream comprising NH3 separated in step c) through a volume of said first absorption liquid. In such an embodiment, there is no need to introduce/reintroduce the third absorption liquid into the first absorption liquid because they are one and the same.

In a second aspect thereof, the present invention provides a system for removal of CO2 from a flue gas stream, the system comprising:

a CO2 absorption stage;
an NH3 absorption stage; and
a reabsorption stage;

said CO2 absorption stage comprising a gas liquid mass transfer device configured to receive a flue gas stream containing CO2, contact the flue gas stream with a first absorption liquid comprising NH3 such that CO2 from the flue gas stream is absorbed in the first absorption liquid and discharge a flue gas stream depleted in CO2;

said NH3 absorption stage comprising a gas liquid mass transfer device configured to receive a flue gas stream depleted in CO2 from the CO2 absorption stage and contact said flue gas stream depleted in CO2 with a second absorption liquid such that NH3 from the flue gas stream is absorbed in said second absorption liquid, and a second absorption liquid regenerator unit configured to separate NH3 from the second absorption liquid and discharge a gas stream comprising NH3 in gas or vapor form; and said reabsorption stage comprising a gas liquid mass transfer device configured to receive a gas stream comprising NH3 discharged from the second absorption liquid regenerator unit and contact said gas stream comprising NH3 with a third absorption liquid such that NH3 is absorbed in said third absorption liquid.

The CO2 removal system of the invention is similar to a conventional ammonia based CO2 removal system with the exception that it further comprises a reabsorption stage comprising a gas liquid mass transfer device (MTD) for capturing NH3 and CO2 present in the gas stream discharged from the second absorption liquid regenerator unit (also referred to as the "stripper offgas stream"). The use of a reabsorption stage in accordance with this invention enables and/or facilitates recycling of NH3 to the CO2 absorption stage. Since the reabsorption stage increases the number of options available for recycling NH3, it also allows for increasing the efficiency of the CO2 removal in the system. The MTD of the reabsorption stage is generally provided separate from the MTD of the CO2 absorption stage. Since the gas stream to be treated by the MTD of the reabsorption stage is relatively small compared to the gas stream treated by the MTD of the CO2 absorption stage, the MTD of the reabsorption stage can be smaller in size and capacity.

In an embodiment of the system for removal of CO2, the CO2 absorption stage further comprises:
an first absorption liquid regenerator unit; and
an absorption liquid cycle;
wherein the gas liquid mass transfer device and the first absorption liquid regenerator unit are in fluid connection via the absorption liquid cycle such that at least a portion of CO2 rich absorption liquid from the gas liquid mass transfer device may be directed to the first absorption liquid regenerator unit, and at least a portion of the CO2 lean absorption liquid from the first absorption liquid regenerator unit may be recycled to the gas liquid mass transfer device.

Generally, the first absorption liquid may be recycled in the MTD of the CO2 absorption stage until a suitable concentration of CO2 has been built up in the liquid (also referred to herein as "CO2 rich" absorption liquid). A portion of the absorption liquid may be withdrawn from the circulation and introduced into an absorption liquid regenerator, wherein CO2 is removed from the liquid while NH3 is retained by the liquid. The absorption liquid with a reduced concentration of CO2 (also referred to herein as "CO2 lean" absorption liquid) may then be returned to the circulation and reused in the MTD of the CO2 absorption stage.

In an embodiment of the system for removal of CO2, the NH3 absorption stage further comprises:
a second absorption liquid regenerator unit; and
an absorption liquid cycle;
wherein the gas liquid mass transfer device and the second absorption liquid regenerator unit are in fluid connection via the absorption liquid cycle such that at least a portion of NH3 rich absorption liquid from the gas liquid mass transfer device may be directed to the second absorption liquid regenerator unit, and at least a portion of the NH3 lean absorption liquid from the second absorption liquid regenerator unit may be recycled to the gas liquid mass transfer device.

Generally, the second absorption liquid may be recycled in the MTD of the NH3 absorption stage until a suitable concentration of NH3 has been built up in the liquid. A portion of the absorption liquid may be withdrawn from the circulation and introduced into a second absorption liquid regenerator, also referred to herein as the stripper, wherein NH3 is removed from the liquid in gas or vapor form. The absorption liquid with a reduced concentration of NH3 may then be returned to the circulation and reused in the MTD of the NH3 absorption stage.

The absorption liquid used in the third MTD, containing absorbed NH3 may advantageously be joined with the first absorption liquid and used in the CO2 absorption stage.

In an embodiment, the reabsorption stage is in fluid connection with the CO2 absorption stage, such that at least a portion of the third absorption liquid containing absorbed NH3 may be joined with the first absorption liquid.

The reabsorption stage may preferably be in fluid connection with the CO2 absorption stage such that the third absorption liquid containing absorbed NH3 may be joined with CO2 rich first absorption liquid.

The reabsorption stage may preferably be in fluid connection with the CO2 absorption stage such that the third absorption liquid containing absorbed NH3 may be joined with CO2 rich first absorption liquid which is directed to the first absorption liquid regenerator unit.

The reabsorption stage may preferably be in fluid connection with the CO2 absorption stage such that the third absorption liquid containing absorbed NH3 may be joined with CO2 rich first absorption liquid which is directed to the CO2 absorption unit.

In an embodiment, the reabsorption stage is in fluid connection with the CO2 absorption stage such that the third absorption liquid containing absorbed NH3 may be joined with CO2 lean first absorption liquid.

The third absorption liquid may be separate from the first absorption liquid. However, in embodiments of the present method and system for CO2 removal, CO2 rich or lean first absorption liquid solution can be used as the third absorption liquid. Thus, at least a portion of the third absorption liquid may be made up of first absorption liquid.

In an embodiment, the reabsorption stage is in fluid connection with the CO2 absorption stage, and the third absorption liquid comprises a portion of the first absorption liquid.

It has been found by the present inventors that the first absorption liquid may advantageously be used as the third absorption liquid. This may for example be done by deriving a portion of the first absorption liquid used in the CO2 absorption, contacting the derived first absorption liquid with the stripper offgas stream in the third MTD, and returning the absorption liquid for reuse in the CO2 absorption, optionally after regeneration.

Thus, in an embodiment, the reabsorption stage is in fluid connection with the CO2 absorption stage, and the third absorption liquid consists of a portion of the first absorption liquid.

In an embodiment, the third absorption liquid consists of a portion of the first absorption liquid and the gas liquid mass transfer device of the reabsorption stage comprises a vessel configured to contain a volume of the first absorption liquid and configured to receive a gas stream comprising NH3 discharged from the second absorption liquid regenerator and bubble the gas stream comprising NH3 through a volume of said first absorption liquid in said vessel. In such an embodiment, there is no need to introduce/reintroduce the third absorption liquid into the first absorption liquid because they are one and the same.

The residual offgas stream produced by the MTD of the reabsorption stage may also be reintroduced into the CO2 absorption stage. The relatively small residual offgas stream can be introduced either directly into the flue gas stream or into an appropriate location of the CO2 removal system where it will not put too much additional burden on the CO2 absorption since the amount of CO2 and ammonia is very small. The co-absorbed non-condensable contaminants from the stripper offgas stream end up in the treated flue gas and not in the CO2 product stream.

In an embodiment, the reabsorption stage is in fluid connection with the CO2 absorption stage such that gas which exits the gas liquid mass transfer device of the reabsorption stage is joined with the flue gas stream before the flue gas stream exits the gas liquid mass transfer device of the NH3 absorption stage.

In an embodiment, the reabsorption stage is in fluid connection with the CO2 absorption stage such that gas which exits the gas liquid mass transfer device of the reabsorption stage is joined with the flue gas stream before the flue gas stream enters the gas liquid mass transfer device of the CO2 absorption stage.

In an embodiment, the reabsorption stage is in fluid connection with the CO2 absorption stage such that gas which exits the gas liquid mass transfer device of the reabsorption stage is joined with the flue gas stream in the gas liquid mass transfer device of the CO2 absorption stage.

In an embodiment, the reabsorption stage is in fluid connection with the CO2 absorption stage such that gas which exits the gas liquid mass transfer device of the reabsorption stage is joined with the flue gas stream between the gas liquid mass transfer device of the CO2 absorption stage and the gas liquid mass transfer device of the NH3 absorption stage.

DETAILED DESCRIPTION

Specific embodiments of ammonia based CO2 removal systems of the prior art and of the present invention are described in detail hereinbelow with reference to the drawings.

Figure 1:
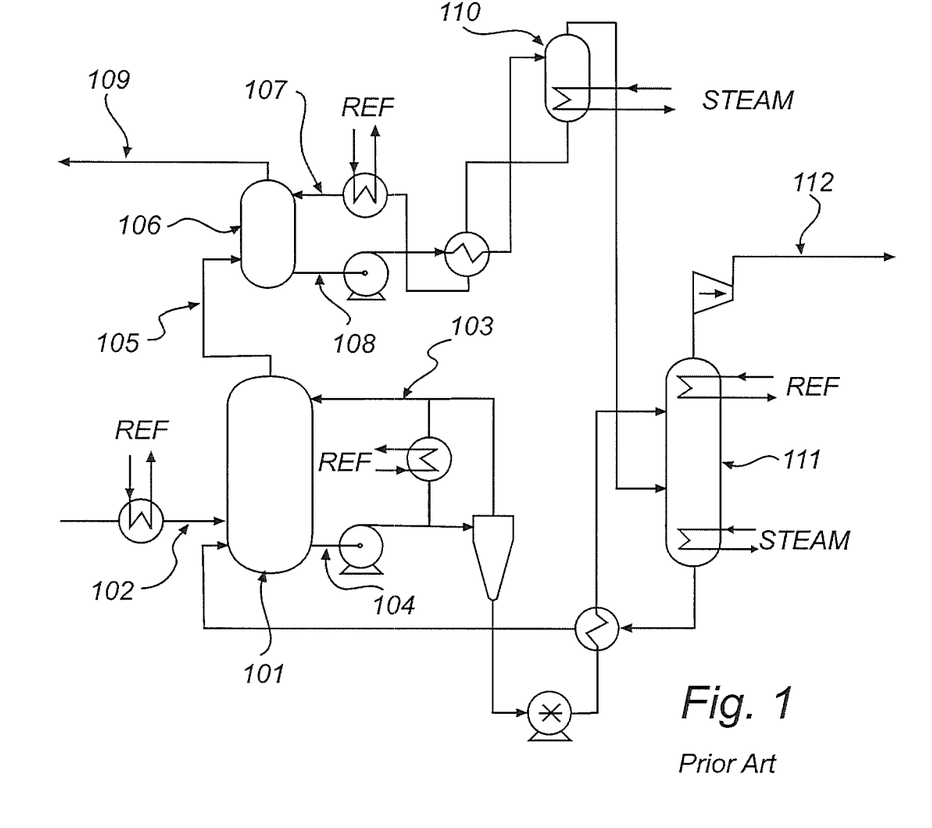
FIG. 1 (Prior art) is a diagram generally depicting a known ammonia based CO2 removal system.

FIG. 1 is a schematic representation of a conventional chilled ammonia based CO2 removal system. The system comprises a CO2 absorption stage comprising a gas liquid mass transfer device (MTD) (101) arranged to allow contact between a gas stream to be depleted in CO2 and an absorption liquid comprising ammonia. Flue gas from which CO2 is to be removed, is fed to the MTD (101) via line (102). In the MTD (101) the flue gas is contacted with an absorption liquid comprising ammonia, e.g. by bubbling the flue gas through said absorption liquid or by spraying the absorption liquid into the flue gas. The absorption liquid comprising ammonia is fed to the MTD via line (103). In the MTD (101), CO2 from the flue gas is absorbed in the absorption liquid, e.g. by formation of carbonate or bicarbonate of ammonium either in dissolved or solid form. CO2 rich absorption liquid, i.e. absorption liquid containing absorbed CO2, leaves the MTD via line (104) and is brought to an absorption liquid regenerator unit (111) where CO2 is separated from the absorption liquid. The separated CO2 leaves the stripping unit via line (112) and the regenerated absorption liquid is recycled to the MTD (101). Flue gas depleted in CO2 leaves the MTD via line (105).

The ammonia based CO2 removal system further comprises an NH3 absorption stage for removing ammonia present in the flue gas after processing in the CO2 absorption stage. The NH3 absorption stage comprises a gas liquid mass transfer device (106). The MTD (106) is arranged to allow contact between the flue gas depleted of CO2 which leaves the MTD (101) and a second absorption liquid which contains no ammonia or a low concentration of ammonia. The second absorption liquid is fed to the MTD of the NH3 absorption stage via line (107). In the MTD (106), contaminants, including NH3, remaining in the flue gas when it leaves the MTD (101) are absorbed in the second absorption liquid. Used absorption liquid containing absorbed contaminants leaves the MTD (106) via line (108). Flue gas depleted of CO2, NH3 and other contaminants leaves the NH3 MTD (106) via line (109). The second absorption liquid enriched with NH3, CO2 and other contaminants may be recycled via an absorption liquid regenerator unit (110), wherein NH3, CO2 and other contaminants can be separated from the absorption liquid. The absorption liquid regenerator unit (110) may generally be a stripper, in which the absorption liquid is heated at a temperature at which lower boiling point components may be transferred to the gas phase to form a stripper offgas stream, while higher boiling point components remain in the liquid phase and may be recycled for use as absorption liquid. The stripper may be heated using high or medium pressure steam.

The stripper offgas stream, generally comprising NH3, CO2 and other low boiling point contaminants, is then fed to the absorption liquid regenerator unit of the CO2 absorption stage (111). Since the absorption liquid regenerator unit (111) is generally operated at high pressures, such as 20 bar or higher, the absorption liquid regenerator unit (110) must also be operated at high pressure.

In an alternative conventional chilled ammonia based CO2 removal system (not shown) the stripper offgas stream from the absorption liquid regenerator unit (110) is fed directly to the CO2 MTD (101).

Figure 2:
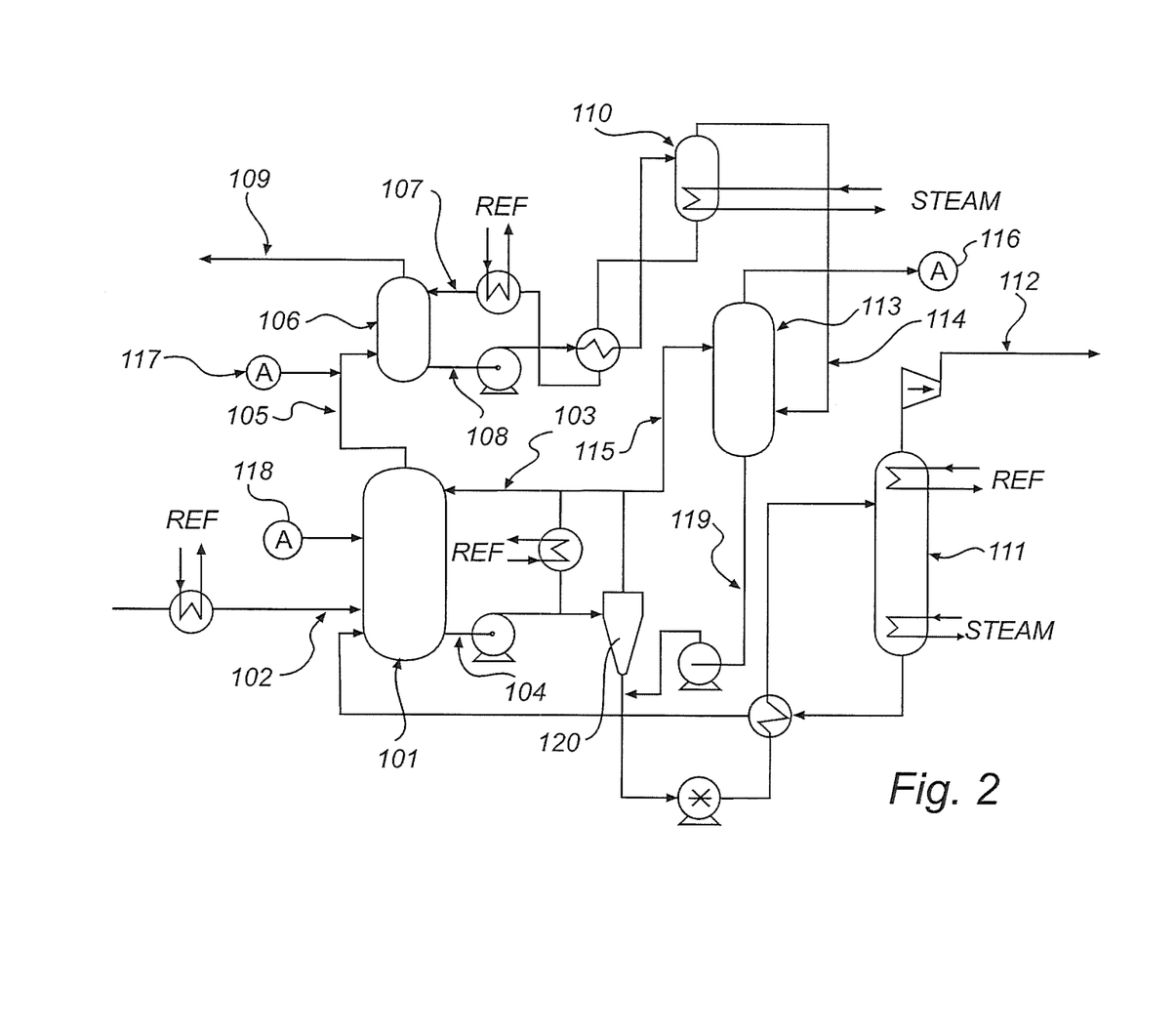
FIG. 2 is a diagram generally depicting an embodiment of an ammonia based CO2 removal system according to the proposed invention.

FIG. 2 is a schematic representation of a chilled ammonia based CO2 removal system comprising a reabsorbtion stage.

The system comprises a CO2 absorption stage comprising a gas liquid mass transfer device (MTD) (101) arranged to allow contact between a gas stream to be depleted in CO2 and an absorption liquid comprising ammonia. Flue gas from which CO2 is to be removed, is fed to the MTD (101) via line (102). In the MTD the flue gas is contacted with an absorption liquid comprising ammonia, e.g. by bubbling the flue gas through said absorption liquid or by spraying the absorption liquid into the flue gas. The absorption liquid comprising ammonia is fed to the MTD via line (103). In the MTD (101) CO2 from the flue gas is absorbed in the absorption liquid, e.g. by formation of carbonate or bicarbonate of ammonium either in dissolved or solid form. Flue gas depleted in CO2 leaves the MTD via line (105). The CO2 absorption stage comprises an absorption liquid cycle configured to recycle the absorption liquid used in the MTD (101), optionally via a regenerator unit (111) wherein CO2 is separated from the absorption liquid. Generally, a portion of CO2 rich absorption liquid used in the MTD (101), i.e. absorption liquid containing absorbed CO2, is drawn off and brought to the absorption liquid regenerator unit. The separated CO2 leaves the regenerator, optionally following compression to liquid form, via line (112) and regenerated absorption liquid (also referred to as lean absorption liquid) is recycled to the CO2 MTD (101).

The ammonia based CO2 removal system further comprises an NH3 absorption stage for removing ammonia present in the flue gas after processing in the CO2 absorption stage. The NH3 absorption stage comprises a gas liquid mass transfer device (MTD) (106). The MTD (106) is arranged to allow contact between the flue gas depleted of CO2 which leaves the CO2 MTD (101) and a second absorption liquid which contains no ammonia or a low concentration of ammonia. The second absorption liquid is fed to the MTD of the NH3 absorption stage via line (107). In the MTD (106), contaminants, including NH3, remaining in the flue gas when it leaves the CO2 MTD are absorbed in the second absorption liquid. Used absorption liquid containing absorbed contaminants leaves the MTD (106) via line (108). Flue gas depleted of CO2, NH3 and other contaminants leaves the MTD (106) via line (109). The second absorption liquid enriched with NH3, CO2 and other contaminants may be recycled via an absorption liquid regenerator unit (110), wherein contaminants are separated from the absorption liquid. The absorption liquid regenerator unit (110) comprises a stripper, in which the absorption liquid is heated at a temperature at which lower boiling point components may be transferred to the gas phase to form a stripper offgas stream (114), while higher boiling point components remain in the liquid phase and may be recycled for use as absorption liquid.

The ammonia based CO2 removal system according to the present invention further comprises a reabsorption stage for absorbing NH3, CO2 and other low boiling point contaminants from the stripper offgas stream. The reabsorption stage comprises a gas liquid mass transfer device (MTD) (113) configured to receive the stripper offgas stream via line (114) from the absorption liquid regenerator unit (110) of the NH3 absorption stage and contact the stripper offgas stream with a third absorption liquid. The stripper offgas stream can be pre-cooled before being fed to the MTD (113), indirectly or by injection of water or solution. The product streams from the reabsorption stage include a stream of third absorption liquid containing NH3 absorbed from the stripper offgas stream and a residual offgas stream possibly containing residual amounts of NH3, CO2 and non-condensable contaminants.

The third absorption liquid which is used in the reabsorption may be any solution capable of absorbing ammonia from the stripper offgas stream. The third absorption liquid may for example be water or an aqueous based solution. In an embodiment, the third absorption liquid is an absorption liquid of the same type used in the CO2 absorption stage. In a preferred embodiment, as shown in FIG. 2, the third absorption liquid is formed by a portion of the first absorption liquid which is derived from the absorption liquid circulation of the CO2 absorption stage via line (115). In other words, the first and third absorption liquid may be portions of the same absorption liquid circulation.

The third absorption liquid used in the reabsorption stage may preferably be joined with the first absorption liquid such that absorbed NH3 may be reused in the CO2 absorption stage. The third absorption liquid may be collected after it has been contacted with the stripper offgas stream in the reabsorption stage. The collected third absorption liquid which contains NH3, CO2 and/or other components absorbed from the stripper offgas stream may then be reintroduced at a suitable position in the CO2 removal system. The collected third absorption liquid may preferably be reintroduced into the CO2 absorption stage. In a preferred embodiment, as shown in FIG. 2, the collected third absorption liquid is reintroduced into a portion of the CO2 absorption stage containing CO2 rich first absorption liquid, for example a portion of the CO2 absorption stage which is configured to transport CO2 rich first absorption liquid to the absorption liquid regenerator (111) of the CO2 absorption stage. In some embodiments, the CO2 absorption stage may include a hydrocyclone unit (120) for increasing the CO2 concentration of the CO2 rich first absorption liquid which is to be transported to the regenerator (111). In such embodiments, the collected third absorption liquid can be reintroduced upstream of the hydrocyclone unit or, as shown in FIG. 2, via line (119) downstream of the hydrocyclone unit in the concentrated CO2 rich first absorption liquid directed towards the regenerator (111).

The residual offgas stream (116) from the reabsorption stage may also be reintroduced at a suitable position in the CO2 removal system. The residual offgas stream may preferably be introduced at a suitable position along the flow path of the gas flue gas stream from which CO2 is to be removed. Suitable positions may include a position upstream of the CO2 MTD (101), inside the CO2 MTD, between the CO2 MTD and the NH3 MTD (106), or inside the NH3 MTD. In FIG. 2 two alternative positions (117 and 118) for reintroduction are shown, inside the CO2 MTD (101) and between the CO2 MTD (101) and the NH3 MTD (106).

The stripper (110) of the NH3 absorption stage in the embodiment of FIG. 2 is advantageously configured to be operated on low pressure steam (e.g. steam having a pressure in the range of 4-8 bar). Alternatively, the stripper (110) may be operated in vacuum conditions and heated by low grade heat ("waste heat") instead of low pressure steam.

The MTD (113) may preferably be operated at a pressure that is only slightly above the pressure of the CO2 absorption in MTD (101), which is usually in a range of about 1.5 to 2.0 bar. The stripper offgas stream, which needs to be fed to the MTD (113) at a slightly higher pressure, can be produced in a stripper operating at a pressure which is only slightly higher than the pressure of the CO2 absorption in MTD (101). As an example, the MTD (113) may be operated at a pressure that is 1-4 bar higher than the pressure in MTD (101), but that is sufficiently low to allow the use of LP steam as the heating medium for the stripper.

The MTD (113) of the reabsorption stage is configured to allow contact between a contaminated gas stream and an absorption liquid. The MTD (113) may e.g. comprise an absorption column, such as a packed bed column. The MTD (113) may preferably be arranged to operate in countercurrent flow mode. As an example, the MTD may comprise an absorption column arranged to operate in countercurrent flow mode, wherein the stripper offgas stream is fed at the bottom portion of the column, and the absorption liquid is fed at the top portion of the column, such that the gas is brought into contact with the absorption liquid as it rises up through the column. The gas stream depleted of contaminants leaves the column at the top portion of the column, while the absorption liquid containing contaminants absorbed from the gas stream leaves the column at the bottom portion of the column. The absorption parameters and dimensions of the MTD may preferably be selected such that only small amounts of NH3 remain in the residual offgas stream obtained after absorption. Such parameters and dimensions may be readily determined by a person skilled in the art.

In an embodiment (not shown in FIG. 2) the gas liquid mass transfer device (MTD) of the reabsorption stage comprises a vessel configured to contain a volume of the first absorption liquid and configured to receive a gas stream comprising NH3 discharged from the second absorption liquid regenerator and bubble the gas stream comprising NH3 through a volume of said first absorption liquid in the vessel. The vessel may preferably be a buffer tank or storage tank for the first absorption liquid, which is arranged in fluid connection with the CO2 MTD (101) and the first absorption liquid regenerator (111). In such an embodiment, there is no need to introduce/reintroduce the third absorption liquid into the first absorption liquid because they are one and the same.

The invention claimed is:
1. A system for removal of CO2 from a flue gas stream, the system comprising:

a CO2 absorption stage;
an NH3 absorption stage; and
a reabsorption stage;
    said CO2 absorption stage comprising a first gas liquid mass transfer device configured to receive a flue gas stream containing CO2, contact the flue gas stream with a first absorption liquid comprising NH3 such that CO2 from the flue gas stream is absorbed in the first absorption liquid and discharge a flue gas stream depleted in CO2; a first absorption liquid regenerator unit; and an absorption liquid cycle;
    wherein the first gas liquid mass transfer device and the first absorption liquid regenerator unit are in fluid connection via the absorption liquid cycle such that at least a portion of CO2 rich absorption liquid from the first gas liquid mass transfer device may be directed to the first absorption liquid regenerator unit, and at least a portion of the CO2 lean absorption liquid from the first absorption liquid regenerator unit may be recycled to the first gas liquid mass transfer device;
    said NH3 absorption stage comprising a second gas liquid mass transfer device configured to receive a flue gas stream depleted in CO2 from the CO2 absorption stage and contact said flue gas stream depleted in CO2 with a second absorption liquid such that NH3 from the flue gas stream is absorbed in said second absorption liquid and a second absorption liquid regenerator unit configured to separate NH3 from the second absorption liquid and discharge a gas stream comprising NH3 in gas or vapor form; and
    said reabsorption stage comprising a third gas liquid mass transfer device configured to receive a gas stream comprising NH3 discharged from the second absorption liquid regenerator unit and contact said gas stream comprising NH3 with a third absorption liquid such that NH3 is absorbed in said third absorption liquid.

2. A system according to claim 1, wherein the NH3 absorption stage further comprises:
    a second absorption liquid regenerator unit; and
    an absorption liquid cycle;
wherein the second gas liquid mass transfer device and the second absorption liquid regenerator unit are in fluid connection via the absorption liquid cycle such that at least a portion of NH3 rich absorption liquid from the second gas liquid mass transfer device may be directed to the second absorption liquid regenerator unit, and at least a portion of the NH3 lean absorption liquid from the second absorption liquid regenerator unit may be recycled to the second gas liquid mass transfer device.

3. A system according to claim 1, wherein the reabsorption stage is in fluid connection with the CO2 absorption stage, such that at least a portion of the third absorption liquid containing absorbed NH3 may be joined with the first absorption liquid.

4. A system according to claim 3, wherein the reabsorption stage is in fluid connection with the CO2 absorption stage such that the third absorption liquid containing absorbed NH3 may be joined with CO2 rich first absorption liquid.

5. A system according to claim 3, wherein the reabsorption stage is in fluid connection with the CO2 absorption stage such that the third absorption liquid containing absorbed NH3 may be joined with CO2 rich first absorption liquid which is directed to the first absorption liquid regenerator unit.

6. A system according to claim 3, wherein the reabsorption stage is in fluid connection with the CO2 absorption stage such that the third absorption liquid containing absorbed NH3 may be joined with CO2 rich first absorption liquid which is directed to the CO2 absorption unit.

7. A system according to claim 3, wherein the reabsorption stage is in fluid connection with the CO2 absorption stage such that the third absorption liquid containing absorbed NH3 may be joined with CO2 lean first absorption liquid.

8. A system for removal of CO2 from a flue gas stream, the system comprising:
    a CO2 absorption stage;
    an NH3 absorption stage; and
    a reabsorption stage;
    said CO2 absorption stage comprising a first gas liquid mass transfer device configured to receive a flue gas stream containing CO2, contact the flue gas stream with a first absorption liquid comprising NH3 such that CO2 from the flue gas stream is absorbed in the first absorption liquid and discharge a flue gas stream depleted in CO2;
    said NH3 absorption stage comprising a second gas liquid mass transfer device configured to receive a flue gas stream depleted in CO2 from the CO2 absorption stage and contact said flue gas stream depleted in CO2 with a second absorption liquid such that NH3 from the flue gas stream is absorbed in said second absorption liquid, and a second absorption liquid regenerator unit configured to separate NH3 from the second absorption liquid and discharge a gas stream comprising NH3 in gas or vapor form; and
    said reabsorption stage comprising a third gas liquid mass transfer device configured to receive a gas stream comprising NH3 discharged from the second absorption liquid regenerator unit and contact said gas stream comprising NH3 with a third absorption liquid such that NH3 is absorbed in said third absorption liquid, wherein the reabsorption stage is in fluid connection with the CO2 absorption stage, and the third absorption liquid comprises a portion of the first absorption liquid.

9. A system for removal of CO2 from a flue gas stream, the system comprising:
    a CO2 absorption stage;
    an NH3 absorption stage; and
    a reabsorption stage;
    said CO2 absorption stage comprising a first gas liquid mass transfer device configured to receive a flue gas stream containing CO2, contact the flue gas stream with a first absorption liquid comprising NH3 such that CO2 from the flue gas stream is absorbed in the first absorption liquid and discharge a flue gas stream depleted in CO2;
    said NH3 absorption stage comprising a second gas liquid mass transfer device configured to receive a flue gas stream depleted in CO2 from the CO2 absorption stage and contact said flue gas stream depleted in CO2 with a second absorption liquid such that NH3 from the flue gas stream is absorbed in said second absorption liquid, and a second absorption liquid regenerator unit configured to separate NH3 from the second absorption liquid and discharge a gas stream comprising NH3 in gas or vapor form; and
    said reabsorption stage comprising a third gas liquid mass transfer device configured to receive a gas stream comprising NH3 discharged from the second absorption liquid regenerator unit and contact said gas stream comprising NH3 with a third absorption liquid such that NH3 is absorbed in said third absorption liquid, wherein the reabsorption stage is in fluid connection with the CO2 absorption stage, and the third absorption liquid consists of a portion of the first absorption liquid.

10. A system for removal of CO2 from a flue gas stream, the system comprising:
a CO2 absorption stage;
an NH3 absorption stage; and
a reabsorption stage;
said CO2 absorption stage comprising a first gas liquid mass transfer device configured to receive a flue gas stream containing CO2, contact the flue gas stream with a first absorption liquid comprising NH3 such that CO2 from the flue gas stream is absorbed in the first absorption liquid and discharge a flue gas stream depleted in CO2;
said NH3 absorption stage comprising a second gas liquid mass transfer device configured to receive a flue gas stream depleted in CO2 from the CO2 absorption stage and contact said flue gas stream depleted in CO2 with a second absorption liquid such that NH3 from the flue gas stream is absorbed in said second absorption liquid, and a second absorption liquid regenerator unit configured to separate NH3 from the second absorption liquid and discharge a gas stream comprising NH3 in gas or vapor form; and
said reabsorption stage comprising a third gas liquid mass transfer device configured to receive a gas stream comprising NH3 discharged from the second absorption liquid regenerator unit and contact said gas stream comprising NH3 with a third absorption liquid such that NH3 is absorbed in said third absorption liquid, wherein the third absorption liquid consists of a portion of the first absorption liquid and the third gas liquid mass transfer device of the reabsorption stage comprises a vessel configured to contain a volume of the first absorption liquid and configured to receive a gas stream comprising NH3 discharged from the second absorption liquid regenerator and bubble the gas stream comprising NH3 through a volume of said first absorption liquid in said vessel.

11. A system for removal of CO2 from a flue gas stream, the system comprising:
a CO2 absorption stage;
an NH3 absorption stage; and
a reabsorption stage;
said CO2 absorption stage comprising a first gas liquid mass transfer device configured to receive a flue gas stream containing CO2, contact the flue gas stream with a first absorption liquid comprising NH3 such that CO2 from the flue gas stream is absorbed in the first absorption liquid and discharge a flue gas stream depleted in CO2;
said NH3 absorption stage comprising a second gas liquid mass transfer device configured to receive a flue gas stream depleted in CO2 from the CO2 absorption stage and contact said flue gas stream depleted in CO2 with a second absorption liquid such that NH3 from the flue gas stream is absorbed in said second absorption liquid, and a second absorption liquid regenerator unit configured to separate NH3 from the second absorption liquid and discharge a gas stream comprising NH3 in gas or vapor form; and
said reabsorption stage comprising a third gas liquid mass transfer device configured to receive a gas stream comprising NH3 discharged from the second absorption liquid regenerator unit and contact said gas stream comprising NH3 with a third absorption liquid such that NH3 is absorbed in said third absorption liquid, wherein the reabsorption stage is in fluid connection with the CO2 absorption stage such that gas which exits the third gas liquid mass transfer device of the reabsorption stage is joined with the flue gas stream before the flue gas stream exits the second gas liquid mass transfer device of the NH3 absorption stage.

12. A system according to claim 1, wherein the reabsorption stage is in fluid connection with the CO2 absorption stage such that gas which exits the third gas liquid mass transfer device of the reabsorption stage is joined with the flue gas stream before the flue gas stream enters the first gas liquid mass transfer device of the CO2 absorption stage.

13. A system according to claim 1, wherein the reabsorption stage is in fluid connection with the CO2 absorption stage such that gas which exits the third gas liquid mass transfer device of the reabsorption stage is joined with the flue gas stream in the first gas liquid mass transfer device of the CO2 absorption stage.

14. A system according to claim 1, wherein the reabsorption stage is in fluid connection with the CO2 absorption stage such that gas which exits the third gas liquid mass transfer device of the reabsorption stage is joined with the flue gas stream between the first gas liquid mass transfer device of the CO2 absorption stage and the third gas liquid mass transfer device of the NH3 absorption stage.

* * * * *